(12) United States Patent
Cottrill et al.

(10) Patent No.: US 11,170,192 B2
(45) Date of Patent: Nov. 9, 2021

(54) APPARATUS AND METHOD FOR IDENTIFYING AND AUTHENTICATING AN OBJECT

(71) Applicant: AT&T Intellectual Property I, L.P., Atlanta, GA (US)

(72) Inventors: William C. Cottrill, Canton, GA (US); Sheldon Kent Meredith, Roswell, GA (US); Yevgeniy Puzyrev, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/020,310

(22) Filed: Sep. 14, 2020

(65) Prior Publication Data

US 2020/0410188 A1    Dec. 31, 2020

Related U.S. Application Data

(63) Continuation of application No. 16/369,121, filed on Mar. 29, 2019, now Pat. No. 10,810,393.

(51) Int. Cl.
*G06K 7/14* (2006.01)
*G06K 19/06* (2006.01)

(52) U.S. Cl.
CPC ........... *G06K 7/1465* (2013.01); *G06K 7/143* (2013.01); *G06K 7/1417* (2013.01); *G06K 7/1447* (2013.01); *G06K 19/06084* (2013.01)

(58) Field of Classification Search
CPC ............... G06K 7/1465; G06K 7/1447; G06K 19/06084; G06K 7/143
See application file for complete search history.

(56) References Cited

U.S. PATENT DOCUMENTS

| | | |
|---|---|---|
| 7,364,074 B2 | 4/2008 | He et al. |
| 7,370,798 B2 | 5/2008 | Juds |
| 7,900,837 B2 | 3/2011 | Sinclair et al. |
| 8,336,783 B2 | 12/2012 | Tang |
| 8,714,442 B2 | 5/2014 | Sharma et al. |
| 8,962,065 B2 | 2/2015 | Dalal et al. |
| 9,082,062 B2 | 7/2015 | Sharma et al. |

(Continued)

FOREIGN PATENT DOCUMENTS

| | | |
|---|---|---|
| CN | 108665028 A | 10/2018 |
| WO | 2018122362 A1 | 7/2018 |

*Primary Examiner* — Matthew Mikels
(74) *Attorney, Agent, or Firm* — Guntin & Gust, PLC; Ralph Trementozzi

(57) ABSTRACT

Aspects of the subject disclosure may include, for example, obtaining a first image of a random distribution of particles overlaying an encoded region of an object identification tag, wherein the first image is obtained according to a first image capture configuration comprising a first image capture angle. The first image is associated with a decoded message determined according to the encoded region resulting in an association between the object identification tag and the first reflection pattern. A second image of the random distribution of particles is obtained according to a second image capture configuration including a second image capture angle, and an authenticity of the object identification tag is determined according to the association, the first image, and the second image. Other embodiments are disclosed.

20 Claims, 11 Drawing Sheets

(56) References Cited

U.S. PATENT DOCUMENTS

| | | |
|---|---|---|
| 9,208,394 B2 | 12/2015 | Dayer et al. |
| 9,342,773 B2 | 5/2016 | Cho et al. |
| 9,658,373 B2 | 5/2017 | Downing |
| 9,691,208 B2 | 6/2017 | Twede |
| 9,811,632 B2 | 11/2017 | Grabiner et al. |
| 9,922,224 B1 | 3/2018 | Nambudiri |
| 2004/0112962 A1* | 6/2004 | Farrall ............. G06K 19/06046 235/462.01 |
| 2012/0310788 A1* | 12/2012 | Naono .................. G06Q 30/06 705/27.1 |
| 2017/0352053 A1 | 12/2017 | Heeter |
| 2018/0174097 A1* | 6/2018 | Liu ....................... H04L 9/3239 |

\* cited by examiner

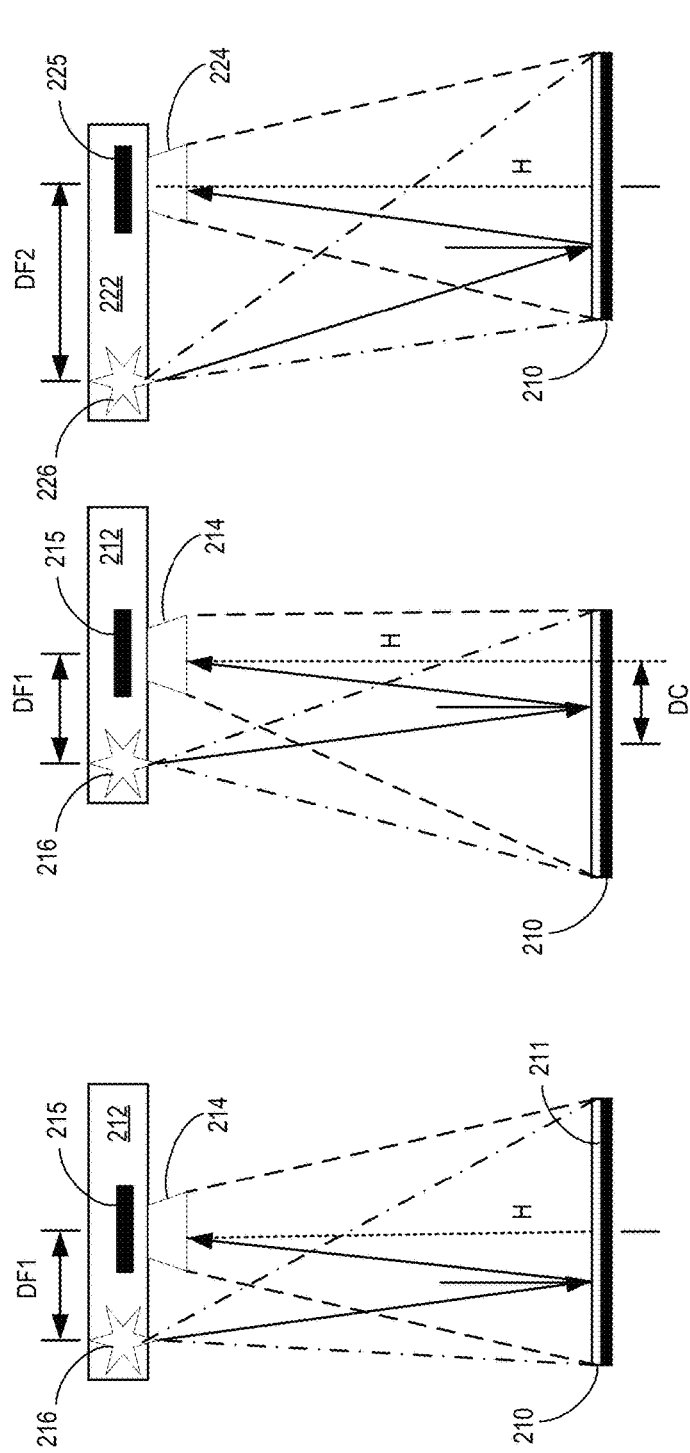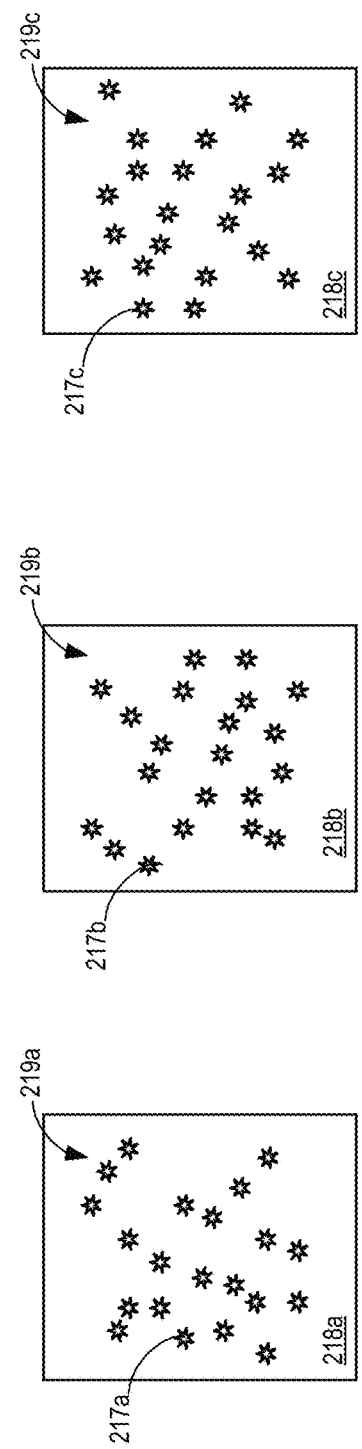
FIG. 2E  FIG. 2F  FIG. 2G

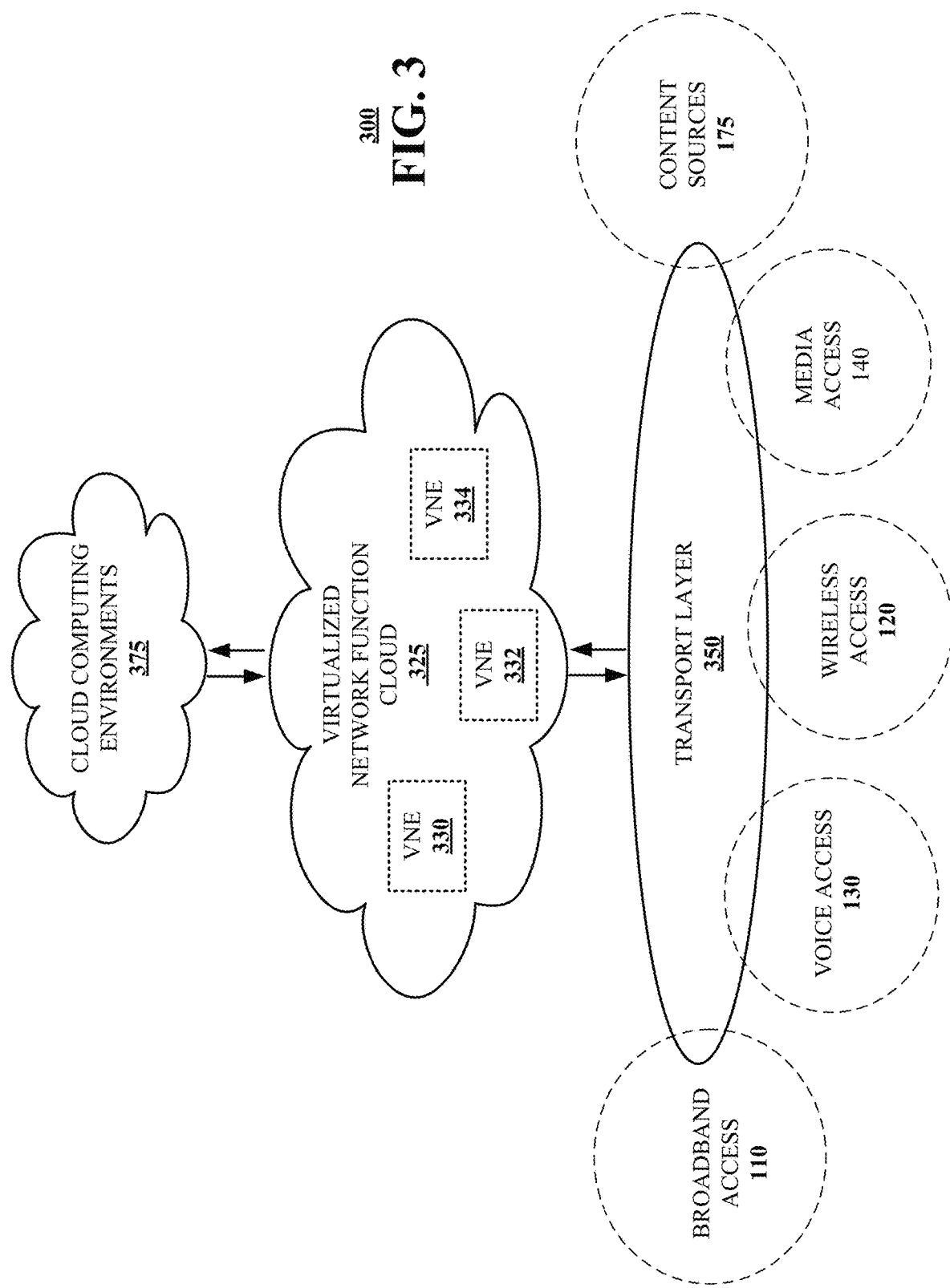

APPARATUS AND METHOD FOR IDENTIFYING AND AUTHENTICATING AN OBJECT

CROSS-REFERENCE TO RELATED APPLICATIONS

This application is a continuation of U.S. patent application Ser. No. 16/369,121 filed Mar. 29, 2019. All sections of the aforementioned application are incorporated herein by reference in its entirety.

FIELD OF THE DISCLOSURE

The subject disclosure relates to an apparatus and method for identifying and authenticating an object.

BACKGROUND

Products are typically marked with a product code to facilitate produce or item identification, classification, and the like. Product codes may be marked directly on an item, or provided on a tag or label affixed to the item. Some codes are human readable, such as make, model and/or serial numbers and SKU (Stock Keeping Unit) codes, which include alphanumeric codes, usually 6 to 8 characters long, that identify products and aid in tracking inventory. Other product codes are machine readable, such as UPCs (Universal Product Codes), i.e., common bar codes and data matrix codes. A data matrix is a two-dimensional barcode consisting of black and white "cells" or modules arranged in either a square or rectangular pattern, also known as a matrix. Still other product codes include combinations of machine readable and human readable elements, such as bar codes that include SKU and/or serial numbers.

Other codes can include electronic product codes, such as codes associated with RFID (Radio Frequency IDentification) tags. Some codes, such as EPCs (Electronic Product Codes) are designed as universal identifiers that provide unique identities for every physical object anywhere in the world, for all time. An EPC structure is defined in the EPCglobal Tag Data Standard. EPCs are not designed exclusively for use with RFID data carriers. They can indeed be constructed based on reading of optical data carriers, such as linear bar codes and two-dimensional bar codes, such as Data Matrix symbols.

BRIEF DESCRIPTION OF THE DRAWINGS

Reference will now be made to the accompanying drawings, which are not necessarily drawn to scale, and wherein:

FIGS. 2E-2G are block diagrams illustrating example, non-limiting embodiments of a product code/authentication code image capturing system in accordance with various aspects described herein.

FIG. 3 is a block diagram illustrating an example, non-limiting embodiment of a virtualized communication network in accordance with various aspects described herein.

DETAILED DESCRIPTION

Figure 1:
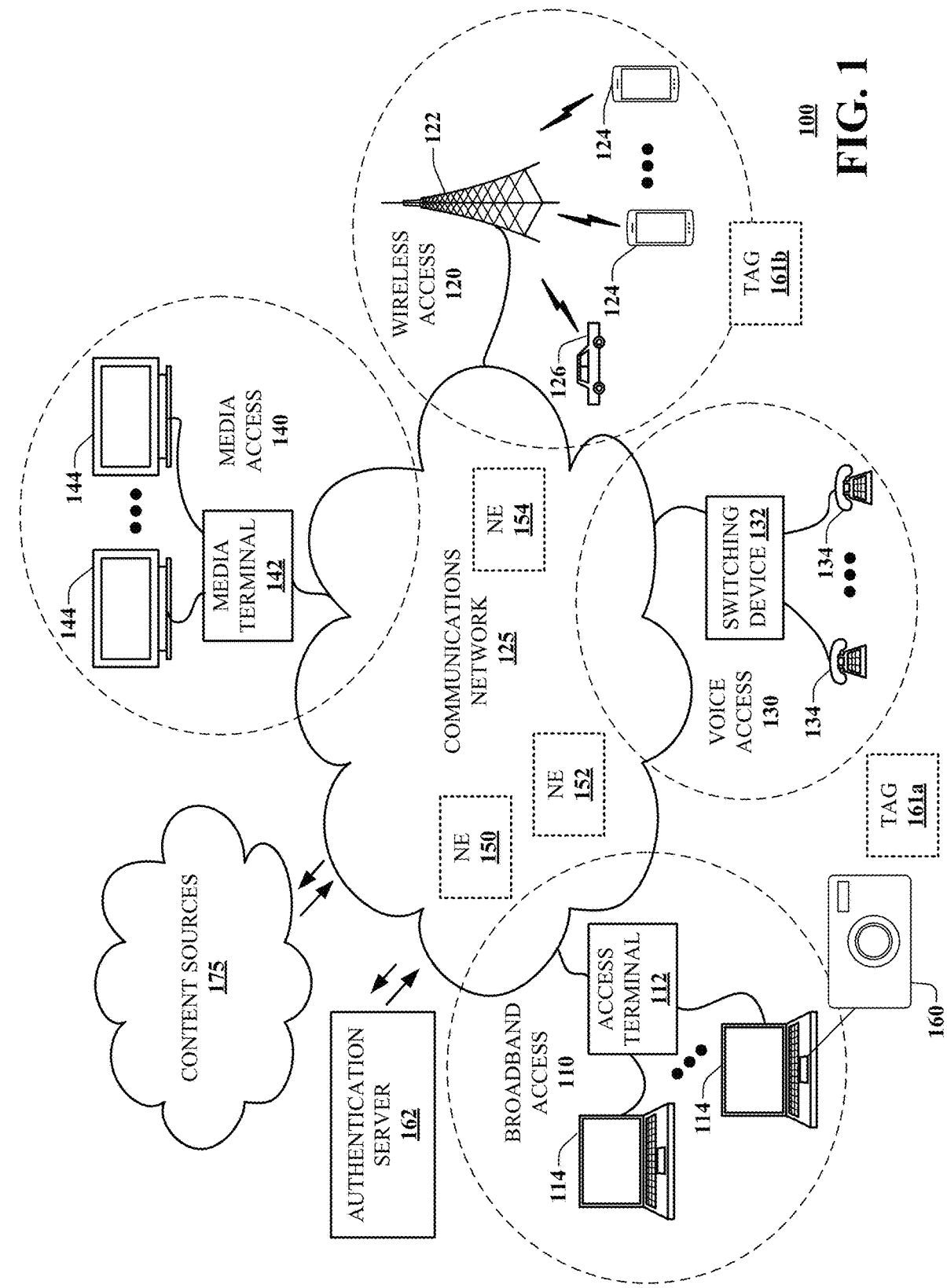
FIG. 1 is a block diagram illustrating an exemplary, non-limiting embodiment of a communications network in accordance with various aspects described herein.

The subject disclosure describes, among other things, illustrative embodiments for an identification label that includes a first region providing encoded message, such as a bar code or a matrix code, and a second region overlaying the first region that includes a randomly generated pattern of reflective elements. Authenticity of the label can be determined based on a comparison of images of the label obtained under different lighting conditions, and/or information determined from the images, to a pre-authenticated result. For example, a predetermined or measured pattern is known by an original manufacturer and is queried in real-time by a specialized mobile software application, requesting confirmation of a match between a photographs of the reflective pattern physically attached to the product. Other embodiments are described in the subject disclosure.

One or more aspects of the subject disclosure include a process that includes capturing an image of an object identification tag including an encoded region and a randomly generated authentication region that includes a random distribution of reflective particles overlaying the encoded region. The encoded region is interpretable from the image and decoded to obtain a decoded message. A first authentication image is captured of the object identification tag, according to a first image capture configuration. The first authentication image includes a first reflection pattern of the random distribution of reflective particles. The first reflection pattern is associated with the decoded message resulting in a first association between the object identification tag and the first reflection pattern. An authenticity of the object identification tag is determined according to the first association and based on a first comparison of the first reflection pattern to a first authenticated reference reflection pattern, and an indication of the authenticity is provided responsive to the first comparison indicating a first substantial match between the first reflection pattern and the first authenticated reference reflection pattern.

One or more aspects of the subject disclosure include a device, having a processing system including a processor and a memory that stores executable instructions. The instructions, when executed by the processing system, facilitate performance of operations that include acquiring an image of a label comprising an encoded region and a randomly generated authentication region that includes a random distribution of reflective particles overlaying the encoded region. An encoded message of the encoded region is interpretable from the image and decoded to obtain a decoded message. A first authentication image of the label is acquired according to a first image capture configuration. The first authentication image includes a first reflection pattern of the random distribution of reflective particles. The first reflection pattern is associated with the decoded message resulting in a first association, and an authenticity of the label is evaluated according to the association and based on a comparison of the first reflection pattern to a first authenticated reference reflection pattern. An indication of authenticity is determined responsive to the comparison indicating a first substantial correlation between the first reflection pattern and the first authenticated reference reflection pattern.

One or more aspects of the subject disclosure include a non-transitory, machine-readable medium, including executable instructions that, when executed by a processing system including a processor, facilitate performance of operations. The operations include acquiring an image of a label having an encoded region and a randomly generated authentication region that includes a random distribution of reflective particles overlaying the encoded region. An encoded message of the encoded region is interpretable from the image and decoded to obtain a decoded message. A first authentication image of the label is acquired according to a first image capture configuration. The first authentication image includes a first reflection pattern of the random distribution of reflective particles according to the first image capture configuration. The first reflection pattern is associated with the decoded message resulting in a first association and an authenticity of the label is determined according to the association and based on a comparison of the first reflection pattern to a first authenticated reference reflection pattern to obtain a determination of an authenticity of the label. Authenticity of the label is determined responsive to the comparison indicating substantial match between the first reflection pattern and the first authenticated reference reflection pattern.

Fraudulent products are a worldwide problem. In many cases the damage includes lost profits to companies making brand-name products, such as handbags, watches, or other consumer products. In some, cases such as artwork, fraud can cost an unsuspecting buyer millions of dollars. A flood of fraudulent products can lead to brand dilution and and/or brand tarnishment, e.g., when a quality of fraudulent products may be inferior. In more egregious cases, such as fake parts for jet engines, structural components, medicines, and medical equipment, and the like, have a direct potential to cause harm.

It is believed that fraudulent product impacts to companies and economies are measured in the hundreds of billions of dollars per year worldwide. There are innumerable references on-line to the health impacts of fake medications (especially cancer treatments) and direct loss of life. Whether the products are car fenders, bottles of aspirin, clothing, engine parts, audio speakers, books, etc., there is virtually nothing that cannot be copied and sold fraudulently. The techniques disclosed herein address such problems, providing solutions that can be used on as many products as possible that are inexpensive, extremely effective, and easy practiced by people to verify the authenticity of products of all types.

At least one approach to such problems involve spraying or painting a clear emulsion (paint) containing reflective particles, such as glass micro-spheres or clear reflective crystals over a symbolic code, such as a bar code or Quick Response (QR) code of a product identification indicia, such as a code or label. A spray an emulsion such as clear acrylic or clear enamel is provided in which the reflective particles are positioned, e.g., glass micro-beads or powdered clear crystals having good light backscatter properties such as is found in tetrahedral structures. In some embodiments, the reflective particles can be sprayed in concentrations of about a few hundred per square cm.

At a point of manufacture, at least two photographs are made. A first photograph of the symbolic code is obtained in a manner such that the overlaying random distribution of reflective particles does not interfere with a decoding of the symbolic code. For example, the first photograph is obtained without a flash, whereas, a second authentication photograph is obtained with a flash. Without a flash, the underlying symbolic code is clearly seen and recorded. However, with the flash, the glass micro-beads and/or powdered crystals backscatter light very effectively in the same manner that a stop sign lights up in the dark when illuminated by headlights. In particular, the beads or crystals provide disproportionate brightness relative to the background.

Since the beads or crystals are suspended in the spray-on emulsion, they have completely random positioning, which is captured in the reference authentication photograph to serve as a reference authentication record of the random positioning. The manufacturer then keeps a record of the photo and a digital representation of the positioning such as relative distances between the bright spots in the flash image and underlying code. The locations of the reflections resulting from the random distribution of reflective particles are essentially not reproducible for any reasonable cost by anyone.

Consider a QR code over-sprayed with a clear emulsion having several hundred of the tiny glass beads. One basically could not reproduce it even with great effort. It is akin to finding a bitcoin. Once the manufacture makes a record of the underlying code, the pattern of reflections in the emulsion over it, and in at least some instances, with other metadata, all can be connected to a common authentication record. Such a common record can be queried at any time after creation and the record is updated every time such an inquiry is made. In at least some embodiments, the queries can be made by a specialized mobile application used for the purpose of verifying these codes with overlain emulsions.

When someone finds a code and positions a mobile device with a camera in front of it and presses a soft-button to take a picture, the software application determines the manufacturer from the code itself. The name of the manufacturer can be displayed on the mobile device. If the manufacturer's authentication or validation service IP address is also included in the code, then it is contacted by the software application via the mobile phone, a wireless network or access point, and the IP network. When connection is established, the mobile software application sends the non-flashed and flashed photos of the code to the remote validation service. The remote validation service compares the imagery to historical imagery made at the time of manufacture and either confirm or denies authenticity back to the mobile device software which then displays the results on the mobile device.

In at least some embodiments, if authentic, a mobile user also sees a history of the article/product in question. For example, the history may indicate that: (i) an article may have been manufactured in Milan on Aug. 8, 2017; (ii) a query was made about authenticity in New York City on Aug. 19, 2017; and (iii) another query was made about authenticity in Pittsburgh on Oct. 9, 2017. In this way the process can preclude someone being able to remove a coded tag from the item such as a mink coat only to ship the tag to another location to be placed onto a fake reproduction item. If that were to occur, the next person to try and verify authenticity would see the history and wonder why the product moved from Milan to NYC to Pittsburgh to a local retailer in Pittsburgh and then a year later is suddenly shows up in Taiwan. Some products such as rare artworks would reasonably be expected to follow odd, worldwide travels, but for many products it would be a red flag.

In order to determine where an inquiry was made from, the mobile device can use its internal GPS receiver for accurate latitude and longitude which can then be associated with a town or city, but it can also use observed mobile network codes which also accurately identify an area corresponding to a mobile telephone switching office (MTSO) or Technical Center. A city like Atlanta would likely have at least three such centers, so sub-city localization can be done.

The mobile software application can be downloaded via an app store such as exist for APPLE and GOOGLE ecosystems and is therefore standardized at its source of development and coding. Virtually anyone in the world would be able to download the same mobile software application and have confidence in it. The developer could also keep an association of manufacturer name and associated web address for product verification to prevent a QR code from containing the correct manufacturer name but a bogus verification web address that could come back and simply claim that the product is authentic. Doing so also allows for situations in which a manufacturer name is static but the associated authentication web address changes after manufacture. This is analogous to a Domain Name Server (DNS) in which a "domain name" is obtained from a QR code and an actual IP address is queried from the DNS.

Since the light "scatter pattern" is unique to every single manufactured item and is not reproducible, then using the scatter or reflection pattern along with the history of queries for authenticity is analogous to using block chains for electronic currency. As part of the metadata returned from the manufacturer's server to the mobile device software application with the authentication determination, we can also include photographs of the product and its packaging including placement of the QR code on the item or package as this could serve as another indicator that something is amiss if placement is incorrect.

Referring now to FIG. 1, a block diagram is shown illustrating an example, non-limiting embodiment of a communications network 100 in accordance with various aspects described herein. For example, communications network 100 can facilitate in whole or in part authentication of an object by way of an especially adapted identification label 161a, 161b (generally 161) attached to the object, by capturing multiple images of the label under ambient and under high-intensity illumination and providing information from the images to a remote authentication authority or entity for evaluation. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, the communications network 100 includes image capture devices, such as a camera 160 or scanner in communication with a data terminal 114, as illustrated, or in direct communication with the access terminal 112. The camera 160 can be outfitted with a flash to capture a first image of the label under ambient illumination and one or more additional images under high-intensity illumination using the flash. In some embodiments, the scanner and/or camera is associated with a mobile device, such as the mobile phone 124, whereby related network communications travers a wireless link, e.g., wireless cellular, WIFI, BLUETOOTH and the like. The images and/or information obtained from the images can be conveyed by the network 100 an authentication entity, such as an authentication application server 162. The authentication application server can evaluate the images and/or other information provided to determine authenticity of the label, and by association, the product or item to which the label is attached. Evaluation can include comparison of the images and/or other data to stored records of the same obtained at a time of manufacture or generation of the product or item, at creation of the label, and/or at a time at which the label is affixed or otherwise attached to the product or item. A result of the comparison can be relayed by the network 100 to other entities, such as the scanning camera 160 or terminal 114.

Figure 2A:
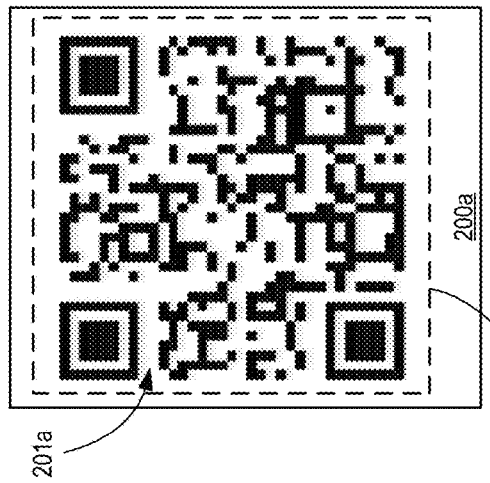
FIG. 2A is a schematic diagram illustrating an example, non-limiting embodiment of a product code scan record in accordance with various aspects described herein.

FIG. 2A is a schematic diagram illustrating an example, non-limiting embodiment of a captured item code image 200a in accordance with various aspects described herein. The item code image 200a includes an imaged representation of an encoded data portion 201a of an item or product label. The item code image 200a is obtained from a product or item and/or a tag or label affixed to the product or item. According to the illustrative example, the encoded data portion 201a of the product label includes a two-dimensional matrix code. The matrix code of the encoded data portion 201a of the product label is confined within a perimeter or border 202a and includes light and dark regions, e.g., white and black regions that correspond to the imaged product tag. In some embodiments, the border 202a is defined by the extent of the matrix code itself, without necessarily including a perimeter edge or line. The item code image 200a is preferably captured under a normal-intensity lighting condition that allows for an unambiguous interpretation of the encoded data of the matrix code of the encoded data portion 201a of the product label across the substantial area bounded by the border 202a. Namely, the normal-intensity lighting condition is bright enough to capture the light and dark features of the matrix code, without being too bright to introduce reflections that might otherwise interfere with the matrix code. In at least some embodiments, the normal-intensity lighting condition includes ambient lighting, e.g., light originating from no particular source or direction. The item code image 200a can be interpreted, e.g., decoded, to access information encoded within the matrix code. The encoded information can include, without limitation, a location reference, such as a network address, e.g., a web address, a URI, a URL, and the like. Alternatively or in addition, the information can include information about the product, such as a manufacturer, a model number or type and/or a serial number, e.g., specific to an item associated with the item code image 200a, a place of origin, an owner, etc.

Figure 2B:
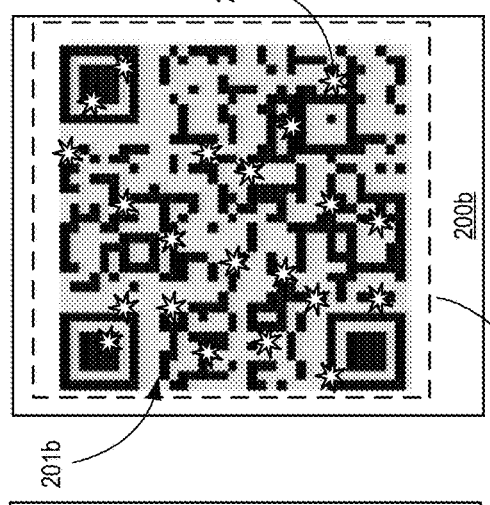
FIGS. 2B-2C are schematic diagrams illustrating example, non-limiting embodiments of an authentication code scan record of a product code in accordance with various aspects described herein.

FIG. 2B is a schematic diagram illustrating an example, non-limiting embodiment of a first captured authentication code image 200b or scan record including a product label image 201b of the product label, which includes an authentication code that overlays the matrix code in accordance with various aspects described herein. The first captured authentication code image 200b is obtained according to a first image capture configuration that, in at least some instances, includes a first special lighting condition that illuminates a random distribution of particles suspended within a layer overlaying the encoded data 201a (FIG. 2A). In at least some embodiments, the first special lighting condition illuminates at least a first subset of the particles of the random distribution sufficiently to induce a first reflection and/or backscatter pattern including reflections/backscatter of the first subset of particles 203a at intensities substantially brighter than imaged portions of the matrix code itself. In at least some embodiments, the first subset of particles 203a are confined within a perimeter or border 202b of an encoded region of the product label image 201b. It is understood that in at least some configurations, the reflections/backscatter pattern interferes with or otherwise prevents an unambiguous interpretation or decoding of the matrix code. It is further understood that in at least some embodiments, the matrix code can include error correction features that may allow for interpretation of the matrix code even under such special lighting conditions.

Figure 2C:
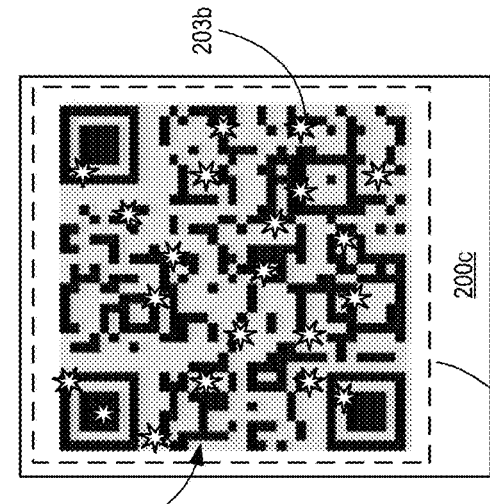

FIG. 2C is a schematic diagram illustrating another example, non-limiting embodiment of a second captured authentication code image 200c including another product label image 201c of the same product label, which includes the authentication code that overlays the matrix code in accordance with various aspects described herein. The second captured authentication code image 200c is obtained according to a second image capture configuration that, in at least some embodiments, can include a second special lighting condition that illuminates the random distribution of particles suspended within a layer overlaying the encoded data 201a (FIG. 2A). In at least some embodiments, the second special lighting condition illuminates at least a second subset of the particles of the random distribution sufficiently to induce a second reflection and/or backscatter pattern including reflections/backscatter of the second subset of particles 203b at intensities substantially brighter than imaged portions of the matrix code itself. In at least some embodiments, the second subset of particles 203b are confined within a perimeter or border 202c of an encoded region of the product label image 201c. The first and second image capture configurations can be different, and in at least some embodiments, differences between the first and second captured authentication images can be attributable, at least in part, to these differences.

In at least some embodiments, one or both of the first and second special lighting conditions includes a high-intensity illumination, e.g., from a flash. Alternatively or in addition, one or more of the first and second special lighting conditions includes a localized light source, e.g., a flash unit, that provides illumination from a localized region, e.g., from the flash unit. One or both of the captured authentication code images 200b, 200c includes the reflections and/or backscatter, that appear in the one or both of the product label images 201b, 201c to be illuminated at a much greater intensity than the underlying tag. In some embodiments, a non-insignificant portion, or substantially all of the features of the matrix code may not be discernable in one or both of the first and second captured authentication code images 200b, 200c, sometimes referred to as scan records.

In at least some embodiments, one or both of the first and second special lighting conditions includes one or more of a predetermined wavelength or band of wavelengths, e.g., a color. The one or more predetermined wavelengths can be achieved using one or more of a narrow band illumination source, e.g., an LED and/or laser, a filter with a relative broad spectrum light source, or a combination thereof. Wavelengths can include, without limitation, one or more of visible light wavelengths, infrared wavelengths, ultraviolet wavelengths and X-rays. Alternatively or in addition, other features of the first special lighting condition can include an intensity of the illumination, a proximity of the illumination source to the illuminated product code 201b, 201c a size of the illumination source, a duration of the illumination, e.g., a pulse, and so on. In at least some embodiments one or both of the first and second special lighting conditions include traditional flash units, e.g., flash lamps, flashbulbs, electronic flash units, strobe lights, flash LEDs and the like.

Figure 2D:
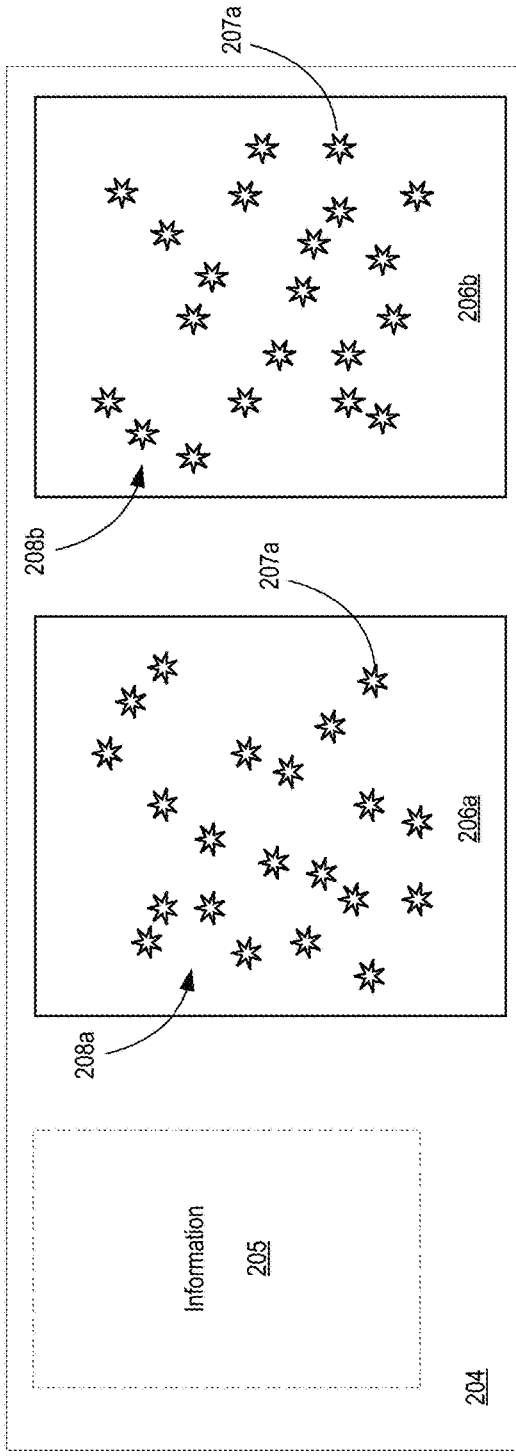
FIG. 2D is a schematic diagram illustrating another example, non-limiting embodiment of an authentication code scan record in accordance with various aspects described herein.

FIG. 2D is a schematic diagram illustrating another example, non-limiting embodiment of an authentication code scan record 204 in accordance with various aspects described herein. The code scan record 204 includes an indication of a first authentication image 206a of a reflection and/or backscatter pattern 208a of reflections 207a of the first subset of the particles of the random distribution suspended within a layer overlaying the encoded data. For example, the indication of the first reflection and/or backscatter pattern of the authentication image 206a provided in the code scan record 204 might include a copy of the image of the product label 201b (FIG. 2B). Alternatively or in addition, the indication of the first reflection and/or backscatter pattern of the authentication image 206a might include another image derived from the image of the product label 201b obtained under the first special illumination. In at least some embodiment, the code scan record 204 also includes an indication of a second authentication image 206b of a reflection and/or backscatter pattern 208b of reflections 207b of the second subset of the particles of the random distribution suspended within a layer overlaying the encoded data.

The derived image can include a result of image processing applied to the image of the product label 201b obtained under the first special illumination. For example, a contrast of the image of the product label 201b can be adjusted to highlight the reflections, while hiding or eliminating features of the matrix code itself. In at least some embodiments, the indication of the first reflection and/or backscatter pattern of the authentication image 206a includes a pixel map in which pixels associated with reflections are one intensity and/or color, while pixels not associated with the reflections are of another intensity or color. It is worth noting that one or more of the images and/or processed images disclosed herein can include, without restriction, color images, grayscale images, black and white images, pixelated images, dotted halftone pattern images, and the like. In some embodiments the backscatter pattern of the authentication images 206a, 206b can be conveyed by a data file, e.g., including text and/or numbers. For example, coordinates and/or pixel locations of reflections can be provided alone or in addition to the one or more backscatter patterns.

In addition to the one or more reflection patterns, the code scan record 204 can include other information 205. For example, the code scan record can include information obtained from the decoded matrix pattern, such as a product identifier and/or serial number. The other information can include, without limitation, textual information images, e.g., a photograph of the tag positioned on the item or product, security information. In at least some embodiments, the other information 205 is provided as metadata information.

FIGS. 2E-2F are block diagrams illustrating example, non-limiting embodiments of a product code/authentication code image capturing system in accordance with various aspects described herein. The example product code capturing system of FIGS. 2E and 2F includes a camera device 212 equipped with a flash unit 216. The camera 212 is configured to capture still images, moving images or both, and includes a lens 214 that focuses a scene, e.g., including an identification tag or label 210 including an authentication layer 211, onto a film or an image sensor 215 positioned along an image plane. In the illustrative example, a flash unit 216 is positioned according to a fixed relationship with respect to the lens 214, e.g., separated by a horizontal distance, DF1. It is understood that there in some embodiments, the fixed relationship can include one or more of a vertical separation distance or a depth separation, such that the flash unit 216 is not contained within a plane of the camera 212, the lens 214 and/or the image sensor 215, as shown.

According to FIG. 2E, the camera 212 is positioned at a height, H, above the label 210. The camera 212, including the flash unit 216 and the image sensor 215 is substantially aligned in a coplanar or parallel arrangement to the label 210. The camera lens 214 is substantially centered with respect to the label 210 and the flash unit 216 is offset from an optical center of the lens 214 according to the distance DF1. The relative position and alignment of one or more of the camera 212, the lens 214, the flash unit 216 or the label 210 can be referred to as a first image capture configuration.

In operation, the camera 212 captures an image of the label 210 under a first lighting condition. The first lighting condition may include ambient lighting, e.g., without flash illumination, or artificial illumination with the flash unit 216 and/or other artificial light source providing a relatively low-intensity illumination. The captured image, e.g., the item code image 200a (FIG. 2A), includes an image of an encoded region of the label 210. Preferably, the captured item code image 200a can be processed to reliably decode the encoded information. In some embodiments, the same camera 212 separately captures another image of the label 210, referred to as a first authentication image 218a, under a high-intensity illumination, e.g., obtained under illumination by a flash lamp. The high-intensity illumination can be provided by the flash unit 216, another artificial light source, or a combination thereof. In the illustrative example, the first authentication image 218a is captured according to the first image capture configuration and includes a first pattern 219a of including a first constellation of bright regions 217a produced by light reflected or scattered by the label 210. The bright regions 217a can have an intensity substantially greater than other regions of the first authentication image 218a.

In at least some embodiments, one or more additional authentication images 218b, 218c of the same label 210 can be captured according to different image capture configurations. The different image capture configurations can differ from the first image capture configuration according to or more aspects, such as a positioning of the camera 212 with respect to the label, e.g., an offset distance, DC, of the lens 214 and the label 210, a height difference of the camera 212 above the label 210, a different angle of the camera 212 or image sensor 215 with respect to the label, i.e., not co-planar to the label 210, a different rotational arrangement of the camera 212 with respect to the label 210, e.g., landscape versus portrait, or any angle in between, and so on. Alternatively or in addition, a relationship of a flash unit 216 to a camera 212 and/or camera lens 214 can be altered according to one or more of a different offset distance, a different depth, a different vertical distance, etc. A second authentication image 218b is captured according to a second image capture configuration with a camera offset distance DC and includes a second pattern 219b of including a second constellation of bright regions 217b produced by light reflected or scattered by the label 210.

According to FIG. 2G, a camera 222 includes a lens 224, an image sensor 225 and a flash unit 226 is positioned above the label 210. According to the illustrative example, the flash unit 226 is separated from the lens 224 and/or image sensor 225 by a distance DF2, that differs from DF1, e.g., DF2>DF1. In some embodiments, the flash unit 216 can be repositioned independently from the camera 212, e.g., as a separate unit. Alternatively or in addition, an entirely different flash unit can be used in a second and/or subsequent image capture configurations. Flash units can differ in position, size, intensity, temperature, wavelength, etc. A third authentication image 218c is captured according to a third first image capture configuration with a flash separation distance DF2, and includes a third pattern 219c of including a third constellation of bright regions 217c produced by light reflected or scattered by the label 210.

Depending upon the structure of the label 210, the first, second and third authentication images 218a, 218b, 218c (generally 218) captured according to the first, second and third different image capture configurations can be substantially the same, e.g., providing first, second and third patterns of light 219a, 219b, 219c (generally 219) that are substantially similar. In some embodiments, again depending upon the structure of the label 210, the first, second and third authentication images 218a, 218b, 218c captured according to the first, second and third different image capture configurations, can be substantially different, e.g., providing first, second and third patterns of light 219a, 219b, 219c that are also substantially different. In some embodiments, two or more of the authentication images, e.g., images 218a, 218b may be substantially the same, while a third authentication image 218c may be substantially different. It is envisioned that in at least some embodiments, according to the structure of the label 210 and the different image capture configurations, a first significant subset of the patterns of light 219 may be substantially similar, while a second significant subset of the patterns of light 219 may be substantially different for any of two or more authentication images 218.

Figure 2H:
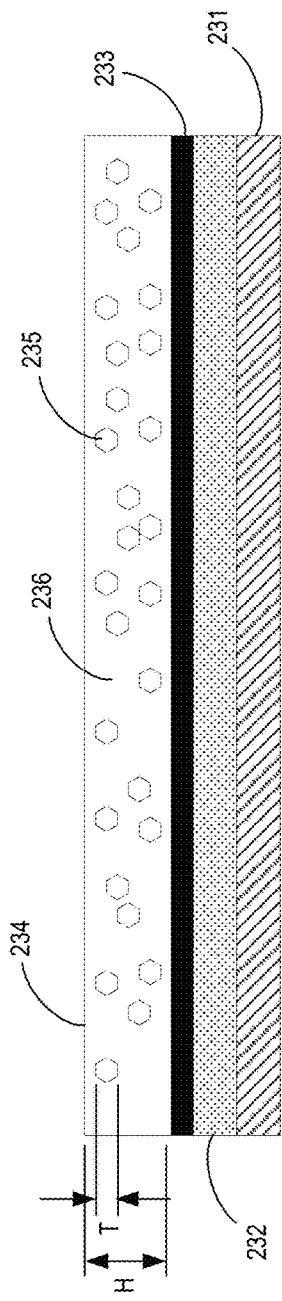
FIG. 2H is a schematic, cross-sectional diagram illustrating an example, non-limiting embodiment of product code/authentication code label in accordance with various aspects described herein.

FIG. 2H is a schematic, cross-sectional diagram illustrating an example, non-limiting embodiment of product code/authentication code label 230 in accordance with various aspects described herein. The example authentication code label 230 includes an adhesion layer 231, a base layer 232, a code marking layer 233, and an authentication layer 234. The base layer 232 provides a substrate upon which the code marking layer 233 is supported. The code marking layer 233 can include one or more of an ink, paint, a dye or any other suitable material adapted to articulate or define an encoded portion of the label 230. Without limitation the encoded portion of the label 230 can include one or more of a symbolic code, such as a barcode and/or a matrix code, an alphanumeric code, or any other suitable shape, form or image capable of encoding information, e.g., pixels of a graphical or photographic image.

In at least some embodiments, the authentication layer 234 can be provided as an over layer, covering some or all of the code marking layer 233. It is understood that under at least some image capture configurations, e.g., a particular lighting and/or scanner or camera positioning with respect to the label 230, the authentication layer 234 does not interfere with a scanning of a code of the code marking layer 233. Thus, a captured image of the label 230 under at least some image capture configurations yields an image of an encoded region of the code marking layer 233 that can be processed to unambiguously decode the encoded information. In particular, the decoding can be unambiguously accomplished despite the authentication layer 234 including reflective particles 235 that partially or completely overlay the code marking layer 233.

In some embodiments, one or more of the base layer 232 and the adhesion layer 231 are adapted to prevent unauthorized removal of the label 230 once affixed to a particular object. For example, the base layer 232 can be formed of an extremely thin and/or delicate material, such that any attempt to remove the label 230 from an object would destroy the label 230. Alternatively or in addition, the adhesion layer 231 can include a strong adhesive adapted to form an extremely adhesive bond between the base layer 232 of the label and the particular object to which it is affixed. Similar techniques are employed to prevent unauthorized removal of official labels, such as registration labels from objects, such as license plates. Accordingly, once a label 230 adapted with such removal prevention features is affixed to an object, any chance of a fraudulent removal and replacement is minimized or eliminated. Thus, authentication of the label 230 can be relied upon for authentication of the object to which the label 230 is affixed.

The authentication layer 234 includes a random distribution of the reflective particles 235. In some embodiments, the reflective particles 235 are suspended within a supporting medium 236 of the authentication layer 234. The supporting medium 236 is adapted to permit an unambiguous decoding of an encoded region of the label defined by the code marking layer 233, despite the image of the code marking layer 233 being captured through the supporting medium 236. For example, the supporting medium can be substantially transparent or translucent to permit observation of an encoded message of the code marking layer 233. Transparence and/or translucence properties of the supporting medium 236 can vary according to one or more of scanning wavelengths, e.g., visible light, infrared, ultraviolet, X-ray, flash temperature, polarization, etc., such that the properties of the supporting medium 236 may be transparent and/or translucent at some regions, while being opaque at others.

According to the illustrative embodiment, the supporting medium 236 of the authentication layer 234 has a thickness H, whereas the reflective particles 235 have a dimension, e.g., a diameter, a width, a depth, a height, of T, where T<H. It is understood that other configurations are possible in which the dimension of the reflective particles 235 is approximately the same as the thickness of the authentication layer 234, T=H. Alternatively or in addition, the dimension of the reflective particles 235 is greater than the thickness of the authentication layer 234, T>H. In some embodiments, the reflective particles are entirely disposed within the supporting medium. In some embodiments, the supporting medium includes a substantially flat or smooth layer following a contour of a surface of the base layer 232 and code marking layer 233. In some embodiments a thickness of the supporting medium 236 is relatively constant, but is adapted to follow a contour of the reflective particles 235, e.g., when a size of the particles 235 is greater than a thickness of a layer of the supporting medium 236, i.e., T>H. Alternatively or in addition, a thickness of the layer of the supporting medium 236 and/or the authentication layer 234 vary across a surface of the label 230.

Accordingly, the random distribution of the reflective particles 235 can include a random depth with respect to a surface of the authentication layer 234. More generally, the random distribution of the reflective particles 235 can include randomness with respect to one or more of particle positions in one, i.e., x-direction, and/or two dimensions, i.e., x, y directions, across the surface of the code marking layer 233 disposed within an x-y plane, depths of the particles 235 with respect to a surface of the authentication layer 234 and/or a surface of the code marking layer 233, orientations of the particles suspended within the supporting medium 236, shape, size and/or constitution of the reflective particles 235. For labels 230 affixed to cylindrical objects, or ellipsoidal objects, randomness of reflective particle positions can be provided according to one or more dimensions, e.g., radial distance, azimuthal angle and height (p, φ, z), or radial distance, polar angle and azimuthal angle (r, θ, φ).

It is understood that in at least some embodiments, product or item codes can be marked directly onto components, ensuring that only the intended component is identified with the encoded data of the product or item code. Codes can be marked directly onto items according to any suitable method, such as painting, silk screening, printing, industrial ink-jet, dot-peen marking, laser marking, and electrolytic chemical etching, to name a few. These methods give a permanent mark which can last up to the lifetime of the product or item. It is understood that the marking of such codes directly onto components can discourage any possibility that a code is removed from one component and placed on another, such that an authenticity of the code can ensure an authenticity of the product, item or component to which the code is attached. It is understood that in such direct-marking embodiments, the base layer 232 can be provided by a surface of the product itself, or of related product packaging. Accordingly, the code label 230 may not include require or included a separate adhesion layer 231.

After the product or item enters service, a product tag or label including a code can be read by a reader or scanner. Example readers or scanners include camera based readers, flatbed scanners, pen-type scanners, laser scanners, CCD readers, LED scanners, video camera readers, and the like. The reader or scanner provides an output representative of the read or scanned code to a decoder that decodes the encoded data, which can then be used for a number of purposes, such as movement tracking or inventory stock checks. In some embodiments, the decoded data includes a Uniform Resource Identifier (URI) is a string of characters that unambiguously identifies a particular resource. A common form of URI is the Uniform Resource Locator (URL), frequently referred to informally as a web address. Some product label scanning applications are adapted to exchange information with one or more remote resources, such as an authentication source, a manufacturer, a retailer, and the like.

Figure 2I:
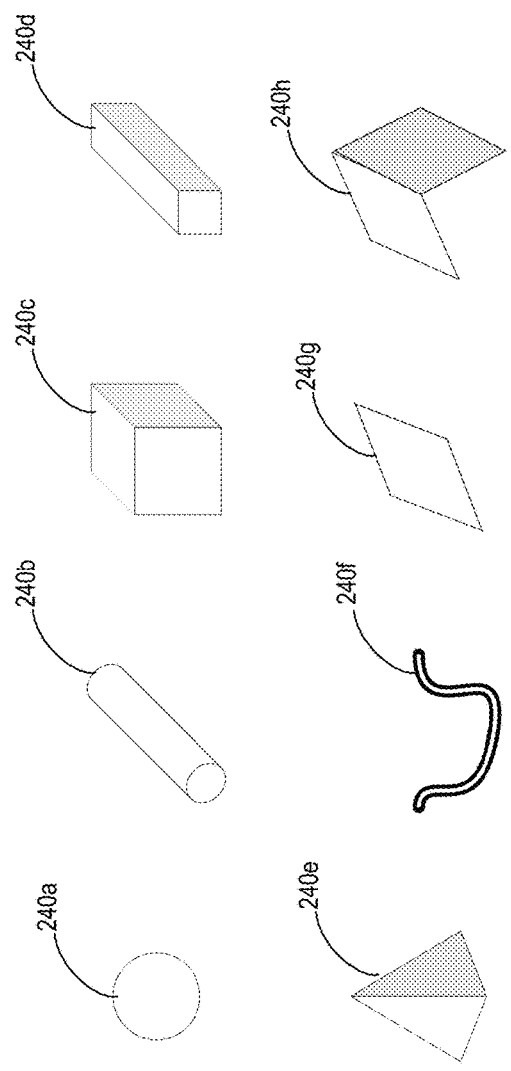
FIG. 2I is a schematic diagram illustrating example, non-limiting embodiments of reflective particles usable within the product code/authentication code label of FIG. 2H in accordance with various aspects described herein.

FIG. 2I is a schematic diagram illustrating example, non-limiting embodiments of reflective particles usable within the product code/authentication code label of FIG. 2H in accordance with various aspects described herein. In some embodiments, the reflective particles are spherical and/or ellipsoidal shaped particles 240a. In some embodiments, the reflective particles include cylindrical, e.g., rod shaped particles 240b. In some embodiments, the reflective particles include cuboidal shaped particles 240c. In some embodiments, the particles include parallellepiped shaped particles 240d, or more generally polyhedron shaped particles having various numbers of sides of various shapes. In some embodiments, the reflective particles include tetrahedron shaped particles 240e. In some embodiments, the reflective particles include thread or fibrous shaped particles 240f, e.g., glass fibers, polymer fibers, natural fibers, synthetic fibers, optical fibers, and the like. In some embodiments, the particles include substantially two dimensional shaped particles, e.g., flakes 240g. In some embodiments, the particles include folder or bent shaped particles 240h. In some embodiments, the particles include random two and/or three dimensional shaped particles having flat surfaces, or facets, curved surfaces, smooth surfaces, rough surfaces, or any combination thereof. It is understood that in some applications the random distribution of reflective particles includes particles of one type, e.g., one shape, one size, one orientation. Alternatively or in addition, in some applications, the random distribution of reflective particles includes particles of more than one type, e.g., and/or more than one shape, and/or more than one size, and/or more than one orientation, and so on.

The reflective particles can be formed of a first material adapted to reflect high-intensity illumination, such as a metal, a crystal, a polymer. In some embodiments the particles are rigid. Alternatively or in addition, the reflective particles can be flexible, e.g., bendable or foldable, such as fibrous particles formed from flexible fibers, e.g., optical fibers. In some embodiments, the particles are formed from more than one material, such as a substrate, e.g., glass, polymers, and a coating, e.g., a metallic coating.

In fabrication, authentication layer 234 is formed over the code marking layer 233 and/or the base layer 232. In some embodiments, the code marking layer 233 is formed onto the base layer 232, which may include a substrate or a surface of an object on which the label 230 is provided. For example, reflective particles 235 are mixed into a liquid solution including a supporting medium 236 in a liquid form. The mixture can then be applied over the code marking layer 233, e.g., by a painting, a spraying, and/or a dipping process. Alternatively or in addition, the reflective particles 235 can be applied to the code marking layer 233 in a first step and the supporting medium 236 applied over the reflective particles 235 in a second step, e.g., according to a painting process, a spray process and/or a dipping process. For example, the reflective particles can be adapted to maintain a random distribution position by an electrostatic charge before application of the supporting medium 236. The supporting medium 236, e.g., a polymer, such as a clear-coat pant or an epoxy is adapted to dry or cure into a relatively hard surface, which may be stiff or flexible, to support the reflective particles 235 in substantially fixed positions.

Figure 2J:
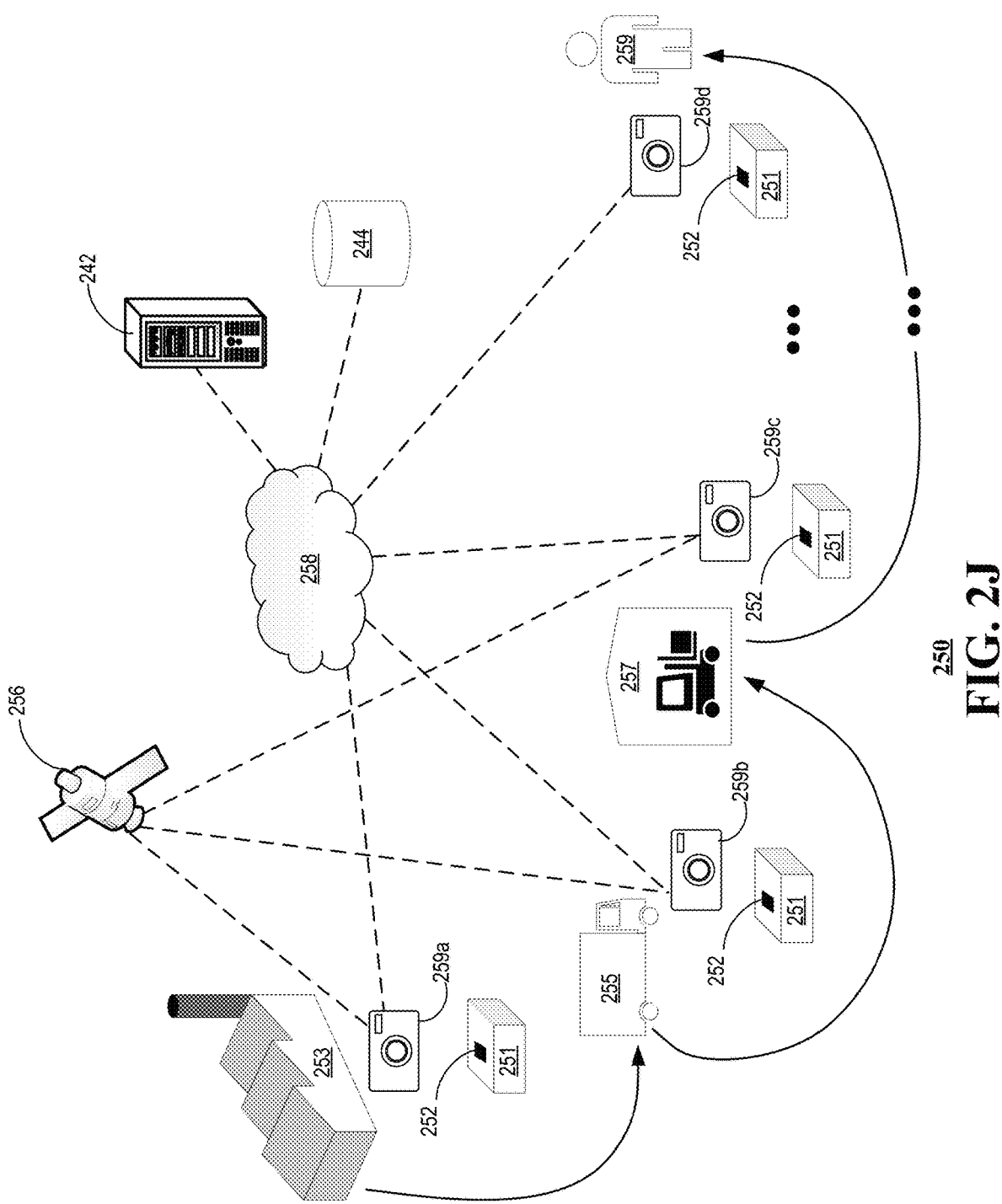
FIG. 2J is a block diagram illustrating an example, non-limiting embodiment of a product authentication system functioning within the communication network of FIG. 1 in accordance with various aspects described herein.

FIG. 2J is a block diagram illustrating an example, non-limiting embodiment of a product authentication system 250 functioning within the communication network of FIG. 1 in accordance with various aspects described herein. According to the illustrative example, a product or component 251 is manufactured at a manufacturing plant or fabrication facility 253. An item identification label 252 is affixed to the product 251 at the point of manufacture 253. The identification label 252 includes one or more of the features disclosed herein, include a product code and an authentication code. One or more images of the label 252 are obtained at the point of manufacture 253, e.g., by a camera 249*a* or other suitable scanning system, according to one or more of the image capture techniques disclosed herein. An authentication record of the authentication code is created from the scanned images obtained at the point of manufacture 253.

In at least some embodiments, other information is associated with the original authentication record. For example, the other information can include one or more of a product type, a serial product number, a product manufacturer, a date of manufacture, a location of manufacture and/or location of original scan. A location can include one or more of a manually entered location, e.g., an address, or an automatically determined location obtained from a location system or service 256, such as a geolocation service, e.g., GPS, a location determined by a mobile cellular service provider, and the like. The authentication record, including the additional information when provided, is stored or otherwise maintained in a secure manner to serve as a reference for subsequent product identifications and/or authentications. For example, the authentication record is obtained by a first scanning device 259*a*, e.g., a camera, and forwarded via a network 258 to an authentication service 242 adapted to maintain a copy of the authentication record in a record repository or storage facility, such as an authentication record database 244.

In at least some embodiments, one or more subsequent photographs, or scans of the label 252 are obtained and used to generate subsequent authentication records. For example, a scan of the label 252 affixed to the product 251 can be obtained by a shipper 255 using a suitably adapted scanning device 259*b*. The scanned image or images can be associated with a location of the scan, e.g., determined according to a location service 256, a date and/or time of the scan, and perhaps other indicia related to an identity of the scanning entity, e.g., the shipper 255, and so on. The process can be repeated, e.g., at a warehouse and/or retail facility 257, and/or by an end user or system integrator 254, capturing images of the label 252 affixed to the product 251 with a suitably configured scanning device 259*c*, 259*d*, associating the captured images with locations, dates, times and/or identities of the scanning entities and generating updated authentication records.

In at least some embodiments, subsequently generated authentication records are provided to the authentication entity for processing and/or evaluation, e.g., to determine authenticity of the scanned label 252, and by its association, the product 251 to which the label 252 is affixed. For example, the authentication entity 242 can compare one or more aspects of a subsequent authentication record to an original authentication record. In at least some embodiments, the original authentication record includes one or more authentication images of the label 252 obtained at the point of manufacture 253. The subsequent authentication records can also provide one or more authentication images of the label obtained at points of scanning obtained subsequently to the time and/or point of manufacture 253. The authentication entity 242 can compare or otherwise correlate the authentication images to determine if the images match to a predetermined degree of specificity. In at least some embodiments, the authentication entity 242 determines whether the subsequently scanned label is authentic, or whether it may be a fraudulent copy and/or whether it may have been tampered with, e.g., fraudulently removed from one item and placed on another. A determination of authenticity can be reported, e.g., to a manufacturer, to an end user 254 and/or to some other entity monitoring such authentications. In at least some instances, a failed authentication can initiate a fraud detection process, such as provision of a warning to a monitoring authority, such as the Federal Aviation Administration, an airframe manufacturer and/or an airline upon detection of a failed authentication of an aircraft component.

In some embodiments, the authentication images are processed, e.g., according to image processing and/or to determine a number value or values indicative of the authentication code. Without limitation, image processing can include image processing include the application of computer algorithms. The computer algorithms can include filtration, edge detection, sharpening, pixilation, application of wavelets, pattern recognition, classification, feature extraction, rotations, translations, and so on. In some embodiments, the processing can be applied remotely, e.g., in a scanning device, and/or locally at the authentication entity. It can be appreciated that remote interpretation may reduce the amount of data, e.g., a size of an authentication record to facilitate transport and/or storage of the authentication records.

Figure 2K:
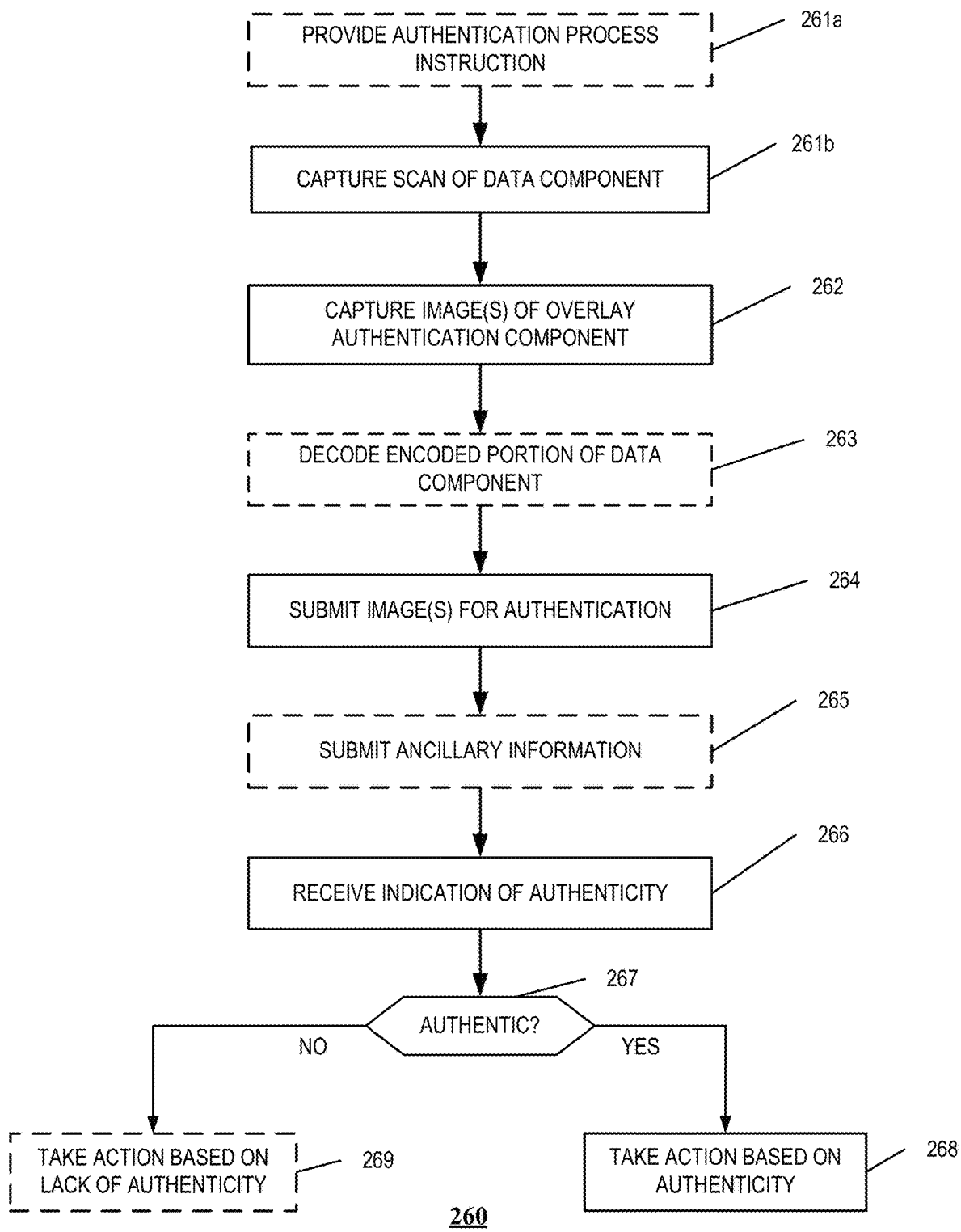
FIG. 2K depicts an illustrative embodiment of a product authentication process in accordance with various aspects described herein.

FIG. 2K depicts an illustrative embodiment of a product authentication process 260 in accordance with various aspects described herein. A scan of a data component of a product label is obtained at 261*b*. This can include a photograph of the product label, a scan of a symbolic code, such as a bar code and/or a matrix code, and/or a scan of an alphanumeric code. In some embodiments, the data component can include a near field scannable component, and/or an RFID tag.

In some embodiments, the image or scan of the data element is responsive to provision of an authentication process instruction at 261*a*. For example, a mobile user may launch a product label authentication application from a mobile device, such as a smart phone, a tablet and/or a laptop device. The authentication process instruction can launch an application adapted to support one or more steps of the example process 260. For example, the application can be adapted to access an image capture module, such as a camera and/or another suitable scanning or module, such as a near field scanning module, and/or an RFID scanning module to initiate a capturing of a scan of the date component at 261*b*.

One or more authentication images of an authentication component of a product label are obtained at 262. The product label can be adapted with an authentication overlay that provides a random distribution of reflective particles disposed at least partially or entirely over an encoded region or data component of the label. One of the authentication images is obtained according to a first image capture configuration. The image capture configuration can include one or more of a relative location, position and/or orientation of the scanning module or camera with respect to the label under scan. It is envisioned that in at least some embodiments, the process 260 provides user guidance to facilitate capture of the authentication images. Guidance can include textual guidance and/or audio, e.g., "position the camera above the label." Alternatively or in addition, the guidance can include frame markers on a camera display screen that can be used to align the camera with respect to the label.

In at least some embodiments, more than one authentication images are obtained at 262 according to different image capture configurations. For example, user instructions may require that a camera be placed at a different location, position, and/or orientation with respect to that used in capturing of the first authentication image. This may include one or more of a lateral offset of the camera, a rotation from landscape to portrait orientation, a tilting of the camera with respect to the label, and so on. Alternatively or in addition, the different image capture configurations may include application of different lighting, e.g., different positioning of a flash unit, different intensities, different wavelengths of illumination and/or image capture, different pulse durations, color temperatures and the like. In at least some embodiments, the capture scan of the data component includes an encoded region, such as a bar code or QR code that can be decoded at 263.

The one or more authentication image are submitted for authentication at 264. In some embodiments, the authentication image(s) are submitted to a remote authentication entity, e.g., a manufacturer or dedicated authentication service. In some embodiments, an encoded portion of the label obtained at 261*b* are decoded to obtain information that can be used in the authentication process. For example, the decoded information can provide an address or URL of the authentication entity that can be used by the native authentication application to determine a destination for forwarding of the images(s).

It is envisioned that in at least some embodiments, the native authentication application is adapted to authenticate different types of labels and/or common labels according to varying levels of authentication. In at least some embodiments, the decoded information can provide instructions and/or references to procedures used by the native authentication application to provide guidance on obtaining the authentication image(s) and/or guidance as to where and/or how such image(s) should be conveyed to the authentication entity.

In some embodiments, ancillary information is obtained and submitted to the authentication entity in association with the submitted image(s) at 264. In some embodiments, the ancillary information includes a location of the scanning event, e.g., determined by a GPS receiver of the mobile device, or reported by a mobile services provider. Alternatively or in addition, the ancillary information includes an identity of the scanning device, an identity of a user operating the scanning device, a photograph of a positioning of the label on the associated product or item, and so on. The ancillary information can be optionally submitted to the authentication entity at 265.

The remote authentication entity evaluates the submitted authentication image(s) and/or any ancillary information to determine an authenticity of the scanned label and by association, the product or item to which the label is affixed. A resulting authentication determination can be provided to and received by the mobile scanning device at 266. A determination of authenticity is obtained at 267, e.g., according to a reported authentication determination. In at least some embodiments, the process 260 takes an action at 268 based on determining that the label and/or product or item is authentic. For example, a verification message can be provided and/or recorded. In at least some embodiments, the process 260 takes an action at 269 based on determining that an authenticity of the label and/or product or item is questionable and/or not genuine. For example, a verification message can be provided and/or recorded indicating a questionable or failed authentication. Alternatively or in addition, an indication of the authentication, genuine or questionable, can be provided in a message, such as an email, an SMS message, can cause an alarm to sound, can acquire a photograph of an operator of the scanner, and so on.

In at least some embodiments, a query history is received, e.g., in association with the determination of authenticity at 267. The query history can include indicia of prior scans, such as scan dates, scan locations, scan authenticity results, scanner identities, to name a few.

In some embodiments, authenticity is based on a comparison of one authentication image captured according to a first image capture configuration to one reference original authentication image captured at a time of manufacture. Alternatively or in addition, authenticity is determined based on a comparison of more than one authentication image captured according to more than one image capture configurations and referenced to more than one reference original authentication images captured at a time of manufacture. For example, depending upon reflective characteristics of the particles of the random distribution of particles provided in an authentication layer of a label, the reflective patterns may be the same under the different image capture configurations.

A first type of reflective particles, such as reflective spheres or tetrahedron crystals acting as corner reflectors, tend to reflect light independent of image capture position, location and/or orientation. A second type of reflective particles, such as irregular shaped articles, parallelepipeds, fibers, flakes and the like tend to reflect light selectively according to the particulars of the image capture configuration. Thus, it is possible to obtain substantially identical reflective patterns for the different authentication images obtained according to different image capture configurations. Likewise, it is possible to obtain substantially different reflective patterns for the different authentication images obtained according to the different image capture configurations. In some embodiments, the random distribution of particles includes both types of reflective particles, such that some reflections will be substantially identical, whereas others will not be substantially identical according to the different authentication images. Whether a label is authentic depends upon a match or correlation between current authentication images and those obtained during a controlled original scan.

In some embodiments, it is envisioned that a number of reflective particles will be between 1 and 10 particles. In other embodiments, it is envisioned that the number of reflective particles will be between 10 and 100 particles. In still other embodiments, it is envisioned that the number of reflective particles will be between 100 and 1000 or greater. Reflective particles can be of a substantially uniform size and/or according to various, e.g., a range of sizes. In at least some embodiments, the size of each particle is less than a minimum spatial resolution of a symbolic code, such as a bar code or a matrix code. Alternatively or in addition, the size of each particle can be approximately equal to or greater than the minimal spatial resolution of the symbolic code.

In some embodiments, the reflective particles are adapted to reflect light according to a range of different wavelengths or colors. For such applications, a single authentication scan can be obtained and evaluated to distinguish reflections of the different wavelengths or colors. Alternatively or in addition, multiple authentication images can be obtained and/or processed, each according to a different one or different range of the different wavelengths or colors.

In some embodiments, one or more of a supporting medium or suspended reflective particles are adapted to respond to unauthorized tampering. For example, an attempt to remove an authentication label from a product may result in a fracturing or cracking of one or more of the supporting medium or the reflective particles. The fracturing or cracking produce and/or otherwise vary a reflection pattern obtained in the authentication image. In some embodiments, the label is configured with a first group of reflective particles to provide reflection patterns, e.g., reflective micro spheres, suitable for determining authenticity. The label can also be configured with a second group of particles, e.g., optical fibers and/or reflective fibers or rods, adapted to change their reflective properties in response to attempted tampering, e.g., increasing a number and/or changing a position of reflections based on movement and/or fracturing of the optical fibers, reflective fibers and/or rods.

Figure 2L:
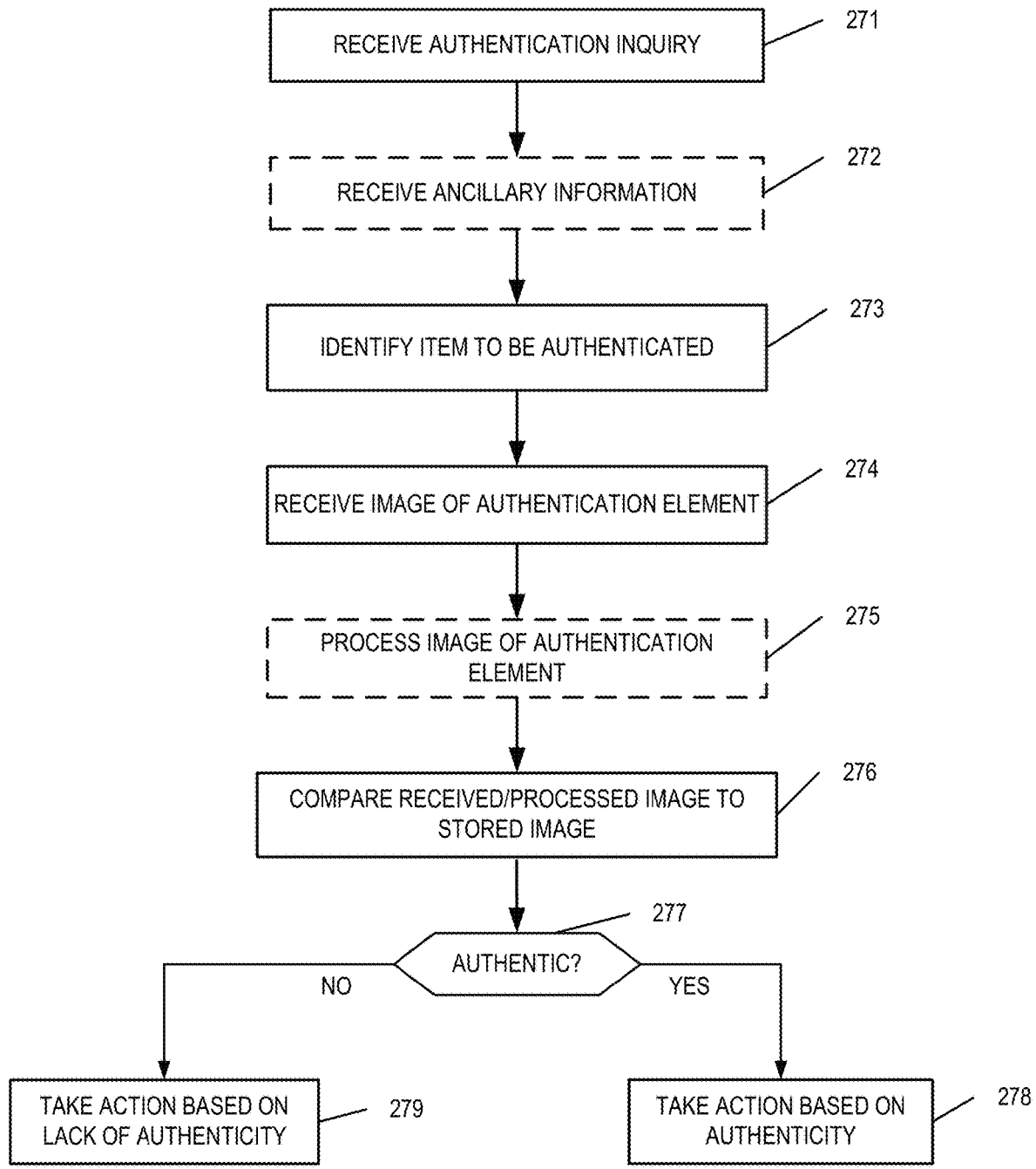
FIG. 2L depicts an illustrative embodiment of another product authentication process in accordance with various aspects described herein.

FIG. 2L depicts an illustrative embodiment of another product authentication process 270 in accordance with various aspects described herein. An authentication inquiry is received at 271. Optionally, the authentication inquiry is received in association with ancillary information at 272, such as scanning location, scanner identity, photographs, and the like.

Information about the item to be authenticated is determined at 273. The information can include a product type, a serial number, a manufacturer, a location, and so on. In some embodiments, the information is obtained from encoded information determined by decoding an encoded portion of a label, e.g., obtained from an image of a labels symbolic and/or alphanumeric code.

One or more authentication images of an authentication element of the label are received at 274. For example, the process 270 can be implemented by an authentication entity or service that receives copies of scanned images. In some embodiments the authentication images are processed at 275. Processing can include, but is not limited to, any of the various image processing techniques disclosed herein or otherwise generally known.

The received authentication image(s) and/or results of processed images are compared to stored reference images and/or results of processed reference images at 276. For example, a received reflection image may be processed to alter one or more of a contrast, a color, an intensity to facilitate separation of reflections from other features of the images. For example, the processed of a pixel image can result in a pixel mask that can be used for comparison. Alternatively or in addition, other features of the images, such as numbers of reflections, distances between reflections, e.g., max distances in one or more directions, intensity of reflections, colors of reflections and the like can be used in the comparison.

A determination of authenticity is obtained at 277, e.g., according to the comparison at 276. In at least some embodiments, the process 270 takes an action at 278 based on determining that the label and/or product or item is authentic. For example, a verification message can be provided and/or recorded. In at least some embodiments, the process 270 takes an action at 279 based on determining that an authenticity of the label and/or product or item is questionable and/or not genuine. For example, a verification message can be provided and/or recorded indicating a questionable or failed authentication. Alternatively or in addition, an indication of the authentication, genuine or questionable, can be provided in a message, such as an email, an SMS message, can cause an alarm to sound, can acquire a photograph of an operator of the scanner, and so on.

In at least some embodiments, a query history is provided, e.g., in association with the determination of authenticity at 277. The query history can include indicia of prior scans, such as scan dates, scan locations, scan authenticity results, scanner identities, to name a few. In some embodiments, the query history depends upon a result of the authenticity determined at 277, e.g., sending or providing a scan history if the scan is authentic, or providing the scan history if the scan is not determined to lack authenticity.

While for purposes of simplicity of explanation, the respective processes are shown and described as series of blocks in FIGS. 2K-2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of processes presented in FIGS. 1, 2A-2L, and 3. For example, virtualized communication network 300 can facilitate in whole or in part an exchange of authentication images, processed image results, determinations of authenticity, and so on.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
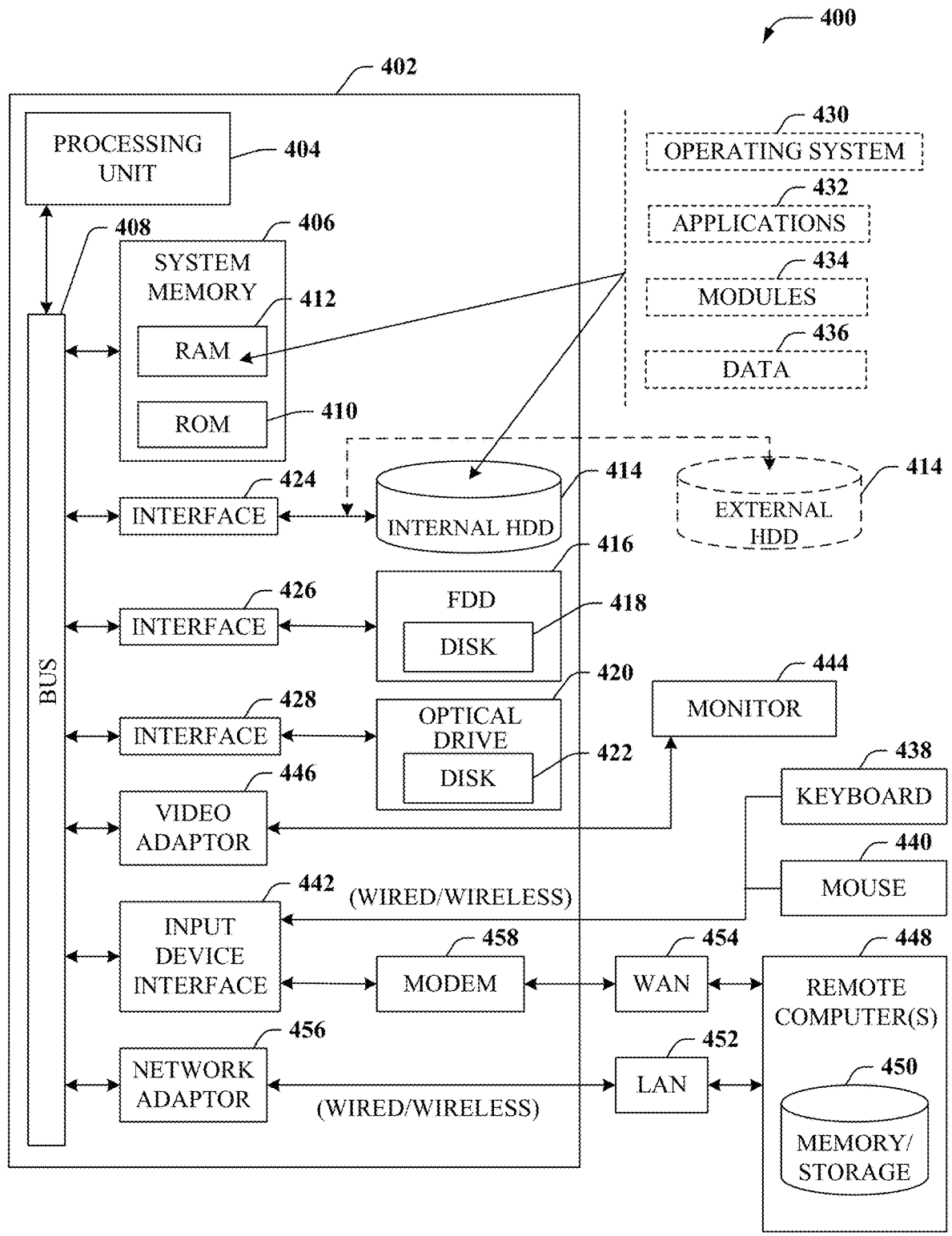
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an exchange of authentication images, processed image results, determinations of authenticity, and so on.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
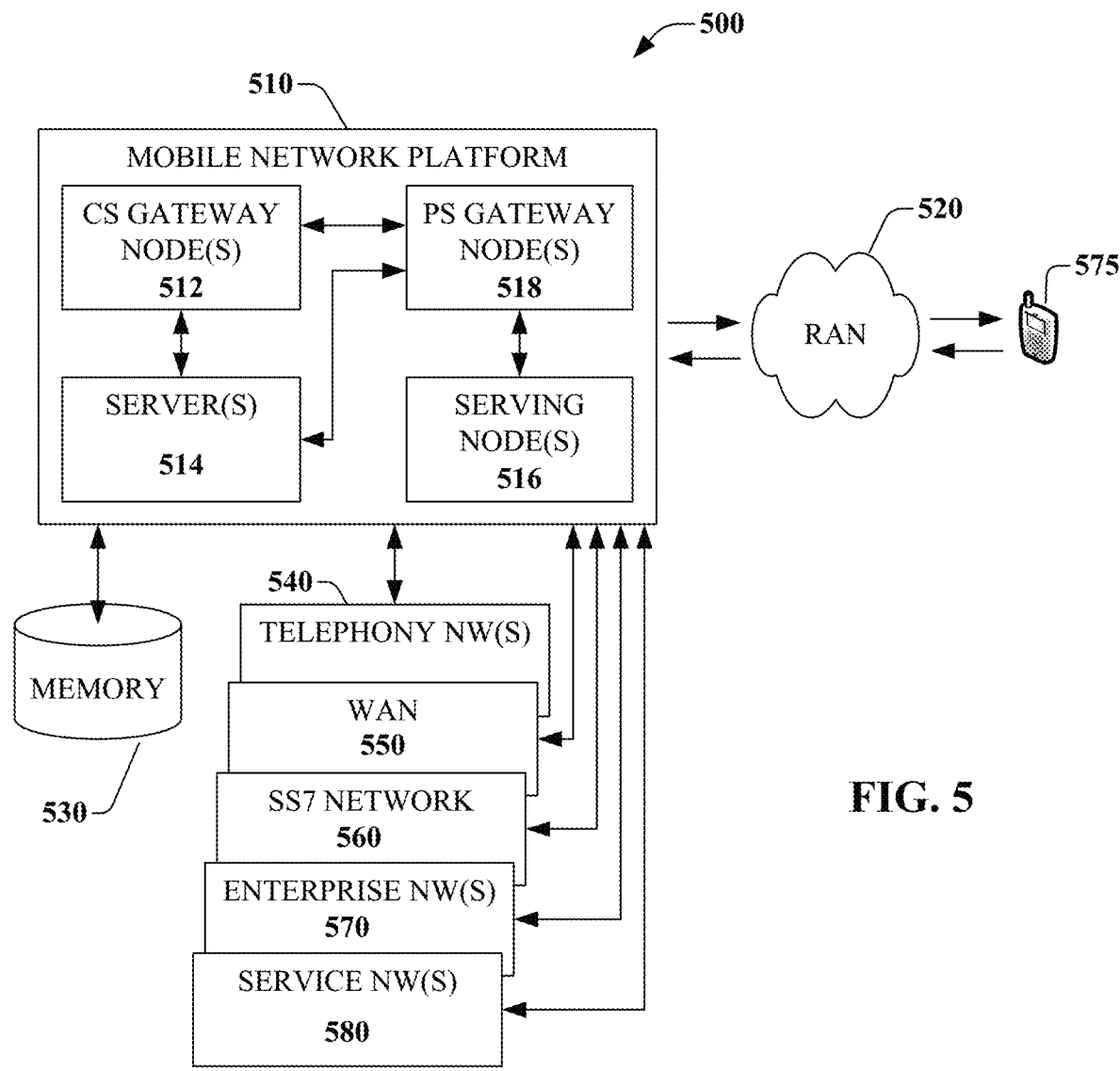
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part one or more portions of the processes 260 and 270 of FIGS. 2K and 2L, the scanning devices, e.g., cameras 212, 222, 259, of FIGS. 2E-2G and 2J the authentication server 242 of FIG. 2J. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
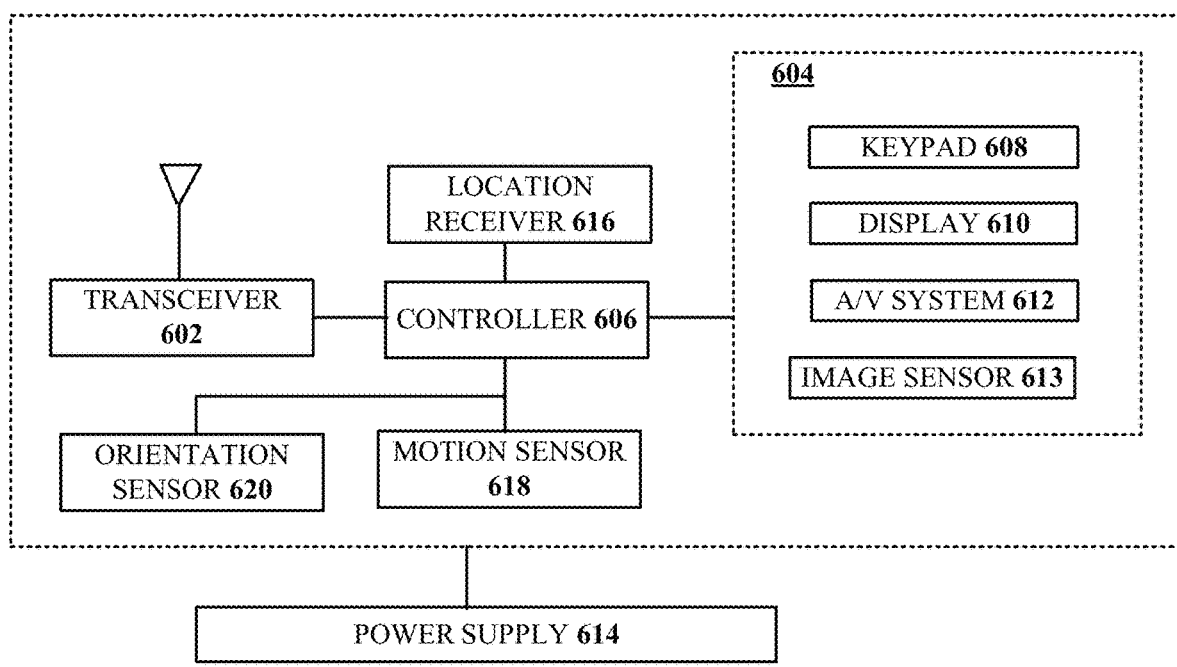
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part one or more portions of the processes 260 and 270 of FIGS. 2K and 2L.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAIVI), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    obtaining, by a processing system including a processor, a first reflection pattern of a random distribution of reflective particles overlaying an encoded region of an object identification tag, wherein the overlaying of the random distribution of reflective particles does not interfere with a decoding of a symbolic code of the encoded region, and wherein the first reflection pattern is obtained according to a first image capture configuration comprising a first image capture angle;
    associating, by the processing system, the first reflection pattern with a decoded message determined according to the encoded region, resulting in a first association between the object identification tag and the first reflection pattern;
    obtaining, by the processing system, a second reflection pattern of the random distribution of reflective particles, wherein the second reflection pattern is obtained according to a second image capture configuration comprising a second image capture angle, wherein the second reflection pattern differs from the first reflection pattern according to a difference between the first image capture angle and the second image capture angle; and
    determining, by the processing system, an authenticity of the object identification tag according to the first association, the first reflection pattern, and the second reflection pattern.

2. The method of claim 1, further comprising:
    associating, by the processing system, the second reflection pattern with the decoded message resulting in a second association between the object identification tag and the second reflection pattern, wherein the first image capture angle comprises a tilting with respect to a surface of an object bearing the object identification tag.

3. The method of claim 2, wherein the determining of the authenticity of the object identification tag further comprises:
    determining, by the processing system, the authenticity of the object identification tag according to the first and second associations and based on a second comparison of the second reflection pattern to a second authenticated reference reflection pattern; and
    providing, by the processing system, an indication of the authenticity responsive to the first substantial match and the second comparison indicating a second substantial match between the second reflection pattern and the second authenticated reference reflection pattern.

4. The method of claim 3, wherein a block chain record of the object identification tag is updated responsive to the providing of the indication of the authenticity.

5. The method of claim 2, further comprising:
    determining, by the processing system, a location reference of an authentication authority from the decoded message; and
    forwarding, by the processing system, the first reflection pattern and an indication of the first association to the authentication authority according to the location reference.

6. The method of claim 5, wherein the location reference comprises a uniform resource locator.

7. The method of claim 2, wherein a first authentication image of the first reflection pattern and a second authentication image of the second reflection pattern are obtained by a camera device.

8. The method of claim 7, wherein the camera device comprises a flash lamp, and wherein the first authentication image and the second authentication images are obtained under illumination by the flash lamp.

9. The method of claim 7, wherein the first image capture configuration and the second image capture configuration differ according to one of an offset distance determined within an image plane parallel to an imaged surface of the object identification tag, an offset angle of the image plane with respect to the imaged surface of the object identification tag, an offset rotation of the camera device with respect to the object identification tag, or any combination thereof.

10. The method of claim 1, wherein shapes of reflective particles of the random distribution of reflective particles comprise one of spheres, rods, fibers, two-dimensional flakes, tetrahedrons, cubes, diamonds, random two-dimensional shapes, random three-dimensional shapes, or any combination thereof.

11. A device, comprising:
a processing system including a processor; and
a memory that stores executable instructions that, when executed by the processing system, facilitate performance of operations, the operations comprising:
obtaining a first pattern of a random distribution of particles overlaying an encoded region of an object identification tag comprising symbolic code, wherein the overlaying of the random distribution of particles does not interfere with a decoding of the encoded region, and wherein the first pattern is obtained according to a first image capture configuration comprising a first image capture angle;
associating the first pattern with a decoded message determined according to the encoded region, resulting in an first association between the object identification tag and the first pattern;
obtaining a second pattern of the random distribution of particles, wherein the second pattern is obtained according to a second image capture configuration comprising a second image capture angle, wherein the second pattern differs from the first pattern according to a difference between the first image capture angle and the second image capture angle; and
determining an authenticity of the object identification tag according to the first association, the first pattern, and the second pattern.

12. The device of claim 11, wherein the operations further comprise:
associating the second pattern with the decoded message resulting in a second association, wherein the determining of the authenticity further comprises determining an authenticity of the object identification tag according to the first and second associations and based on a second comparison of the second pattern to a second authenticated reference pattern, wherein the first image capture angle comprises a tilting with respect to a surface of an object bearing the object identification tag, and wherein an indication of authenticity is determined responsive to a first comparison indicating a first substantial correlation between the first pattern and a first authenticated reference pattern and responsive to the second comparison indicating a second substantial correlation between the second pattern and the second authentication reference pattern.

13. The device of claim 12, further comprising:
providing an indication of the authenticity responsive to the indication of authenticity.

14. The device of claim 12, wherein the operations further comprise:
determining a location reference of an authentication authority from the decoded message; and
facilitating a forwarding of the first pattern and an indication of the first association to the authentication authority according to the location reference.

15. The device of claim 12, wherein the first image capture configuration comprises a first directed illumination and the second image capture configuration comprises a second directed illumination, and wherein the first directed illumination differs from the second directed illumination according to an illumination property.

16. The device of claim 15, wherein the illumination property comprises one of a wavelength, an intensity, a position, an angle, or any combination thereof.

17. A non-transitory, machine-readable medium, comprising executable instructions that, when executed by a processing system including a processor, facilitate performance of operations, the operations comprising:
obtaining a first image of a random distribution of particles overlaying an encoded region of an object identification tag comprising symbolic code, wherein the overlaying of the random distribution of particles does not interfere with a decoding of the encoded region, and wherein the first image is obtained according to a first image capture configuration comprising a first image capture angle;
associating the first image with a decoded message determined according to the encoded region resulting in a first association between the object identification tag and the first image;
obtaining a second image of the random distribution of particles, wherein the second image is obtained according to a second image capture configuration comprising a second image capture angle, wherein the second image differs from the first image according to a difference between the first image capture angle and the second image capture angle; and
determining an authenticity of the object identification tag according to the first association, the first image, and the second image.

18. The non-transitory, machine-readable medium of claim 17, wherein the operations further comprise:
associating the second image with the decoded message resulting in a second association, wherein the first image capture angle comprises a tilting with respect to a surface of an object bearing the object identification tag;
determining an authenticity of the object identification tag according to the first and second associations and based on a comparison of the second image to a second authenticated reference image; and
providing an indication of the authenticity responsive to the comparison indicating substantial match between the first image and a first authenticated reference image.

19. The non-transitory, machine-readable medium of claim 18, wherein the random distribution of particles substantially entirely overlaps the encoded region.

20. The non-transitory, machine-readable medium of claim 19, wherein a block chain record of the object identification tag is updated responsive to the determining of the authenticity of the object identification tag.

* * * * *